Sept. 13, 1960 A. J. WEATHERHEAD, JR 2,952,481
TUBE FITTING HAVING MEANS TO ACCOMMODATE FLEXING OF THE TUBE
Filed Jan. 11, 1957

INVENTOR.
ALBERT J. WEATHERHEAD, JR.
BY
RICHEY, WATTS, EDGERTON & McNENNY
Donald W. Farrington
ATTORNEYS

United States Patent Office 2,952,481
Patented Sept. 13, 1960

2,952,481

TUBE FITTING HAVING MEANS TO ACCOMMODATE FLEXING OF THE TUBE

Albert J. Weatherhead, Jr., Shaker Heights, Ohio, assignor to The Weatherhead Company, Cleveland, Ohio, a corporation of Ohio Filed Jan. 11, 1957, Ser. No. 633,571

2 Claims. (Cl. 285—116)

This invention relates to tube couplings and more particularly to a tubular nut especially useful in a flared tube coupling.

A type of tube coupling widely used is a coupling wherein the end of the tube which is to be coupled is fitted with a tubular nut and the end portion of the tube is flared outwardly by a flaring tool so that when the nut and tube are assembled in a fitting the flared end of the tube is tightly gripped between the inner end of the tube nut and a portion of the body of the fitting.

It is an object of the present invention to provide a tube nut having an axial bore to receive the tube wherein the diameter of the bore is varied along the axial extent of the nut so that the assembled coupling will accommodate flexing of the tube so as to minimize failure of the coupling when subjected to vibration.

It is a further object of my invention to provide a tube nut having an axial bore to receive the tube wherein the bore diameter intermediate the ends of the nut is larger than the diameter of the bore at either end of the nut whereby a coupling provided with such a tube nut holds and prevents fatigue cracking of the tube when subjected to vibration.

It is a further object of my invention to provide a tube nut according to the preceding objects which is made by shaping steel while cold and wherein the diameter variation is obtained by confining the nut blank throughout its axial extent while the bore is being punched out of the nut blank.

Further objects and advantages relating to low manufacturing costs and long coupling life will appear from the following description and the appended drawings, wherein Fig. 1 is a sectional elevation showing a tube coupling made according to my invention;

Figure 1:
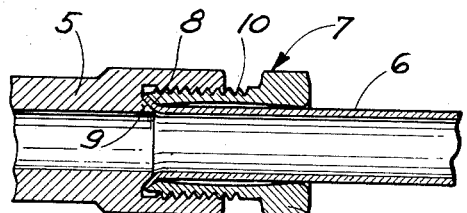

Referring to the drawings. A tube coupling employing a tube nut according to my invention is shown in Fig. 1 wherein 5 indicates the body of a fitting that is to be coupled to a tube 6 by means of the tube nut 7.

As will be understood by those skilled in the art, the nut 7 is first slipped over the end of a length of tubing 6 which is to be coupled to the body 5. The end of the tubing is flared by means of a flaring tool (not shown) which supports the tube near the open end thereof and forms the flare 8 which conforms to the tapered nose portion 9 on the fitting body 5. The nose portion 9 is convexly flared to receive the flared end of the tube 6 to be coupled. The nut 7 is generally tubular and is threaded at its exterior as at 10 to receive co-operating threads formed within the fitting body 5. The end portion or back indicated at 11 of the tube nut is provided with the usual hex shape wherein the flat faces of the hex are tangent to the cylindrical nut body. The inner or forward end of the tube nut 7 is concavely flared to engage the outer flared surface of the end of the tube which is to be coupled.

Figure 2:
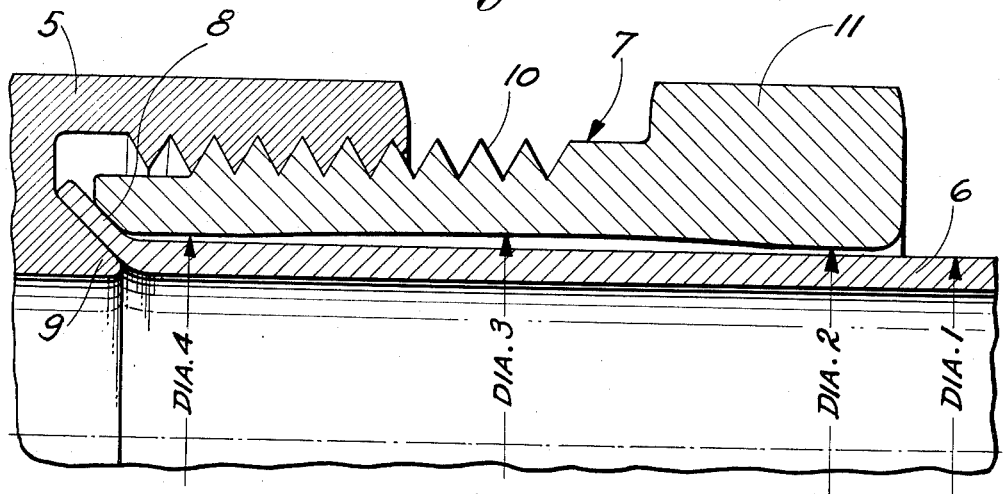
Fig. 2 is an enlarged sectional view showing the diameter variations in the bore of the nut.
Figure 4:
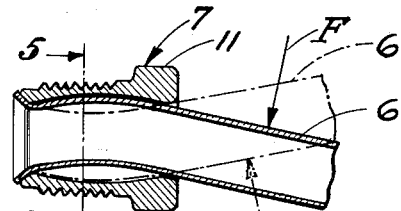
Fig. 4 is a sectional view of the tube and nut with exaggerated clearance between them showing the tube being flexed with respect to the tube nut of my invention.
Figure 5:
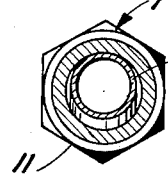
Fig. 5 is a sectional view taken along the plane indicated at 5—5 of Fig. 4.

According to my invention, the bore of the tube nut 7 is formed with a diameter as at Dia. 3 indicated in Fig. 2 which is greater than the diameter Dia. 2 at the back of the nut and is also greater than the diameter Dia. 4 at the seat portion of the nut. Dia. 1 indicates the outside diameter of the tube 6. By forming the central portion of the bore of the tube nut with a diameter greater than the end portions of the bore, the interior of the tube nut may accommodate to a limited extent the bending or flexing of the tube 6 that may be occasioned by vibrational forces. This is illustrated in Fig. 4 wherein forces occasioned by vibration in the direction of the arrows F and F' causes a limited bending or flexing of the tube within the tube nut. The clearance proportions are exaggerated in the drawings to illustrate the way in which the bore of the tube nut accommodates the bending of the tube in response to vibration.

It will be understood that the tube nuts of the prior art are characterized by a straight uniform diameter bore and when flared tube assemblies are made using a straight bore nut the tube is not permitted to bend within the tube nut. Accordingly, the loads were concentrated either at the seat portion of the nut at the tube flare or at the back of the nut. Thus with straight bore tube nuts the tube failed when subjected to vibration by cracking at the seat of the nut where the flare was formed or at the back of the nut where the tube emerges from the nut.

The diameter variation according to my invention may be varied within limits with different tube diameters and different tube metals. An example of diameter variation which results in great prolongation of the tube life when subjected to vibration is as follows: A copper brazed steel tubing having a wall thickness of .028 inch is used. Assuming an outer tube diameter of .186 inch (Dia. 1 of Fig. 2), the bore at the back of the nut is about .191 inch (Dia. 2 of Fig. 2). In this example, the bore at the center of the nut has a diameter of about .194 inch (Dia. 3 of Fig. 2). With this installation, the diameter of the bore of the nut at the seat portion is about .192 inch (Dia. 4 of Fig. 2). With a tube fitting assembly having the materials and proportions referred to here, the tube coupling remained tight and secure under pressure and there was no failure of the tube or nut when subjected to ten million cycles of vibration at the rate of 1750 cycles per minute. The deflection employed for the vibration cycle test was .090 inch. The nut thus tested was a cold forged steel nut.

Figure 3:
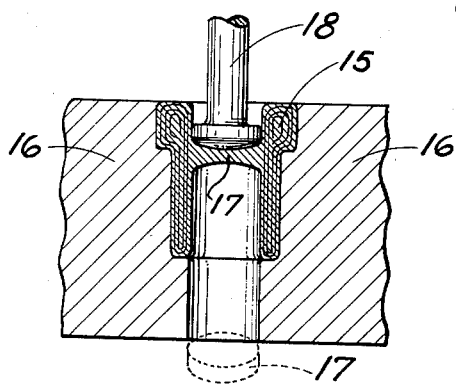
Fig. 3 is a sectional elevation showing the apparatus and method employed for making a cold forged tube nut according to my invention.

A tube nut having the bore diameter variation as above described may be conveniently formed by cold upsetting a blank in the form of the tube nut and punching out the bore of the tube nut while the blank is confined in a die. An apparatus for making such a tube nut is illustrated in Fig. 3, wherein the tube nut blank 15 is confined throughout its length in a holding die 16 and the web or slug 17 is punched out of the bore of the blank by a punch 18. The cold upsetting and working of the blank 15 results in desirable grain flow of the metal as indicated in the cross section of the blank in Fig. 3. All of the reasons for the diameter variation in the bore of the tube nut by use of the apparatus illustrated in Fig. 3 are not known. It appears that the metal of the nut blank may move within its elastic limit at each end of the blank as the punch 18 is moved through the blank and thus the diameters at the end of the bore spring back to a diameter less than the diameter at the center of the bore. In any event it will be understood that if the method of forming the nut of the material of which the nut is made results in a straight uniform bore, the bore should thereafter be increased in diameter at the central portion before assembly with the tube 6 and the fitting body 5.

Although in the particular example of my invention set out above reference is made to copper brazed steel tubing, it will be understood that the tube nut of my invention will prolong the tube life of tubes made of other metal. For example, many installations are made with relatively soft copper tubing in locations where the fitting is subjected to vibration. Such copper tubing under repeated flexing becomes work-hardened with conventional tube nuts. Use of the tube nut, according to my invention, lowers the rate at which such work-hardening progresses. Tube couplings using aluminum, brass and stainless steel tubing are also well-suited for use with the tube nut of my invention.

Although I have described and illustrated one form of my invention in considerable detail, it will be understood that numerous variations may be made therein without departing from the scope of the invention as defined in the following claims.

What is claimed is:

1. A tube and tube fitting assembly comprising a fitting having a body portion formed with a convexly flared tube end sealing surface, said fitting also including a tube nut portion having a bore for receiving the tube, mating threads on said fitting portions, the inner end of said tube nut having a concavely flared tube clamping surface that is substantially complementary to the convexly flared surface of said fitting body portion, a tube having a tubular portion extending through the tube nut bore and a flared end portion disposed between the flared surfaces of said fitting, the bore of said tube nut being a smooth surface of revolution with a major diameter intermediate the flared tube clamping surface of the tube nut and the outer end of the bore, the diameter of the inner and outer end portions of the bore of said tube nut being larger than the unflared diameter of the tube, said diameters of said tube nut accommodating and distributing flexure imparted to the tube along that portion of the tube that lies between the inner clamped flared end portion of the tube and the outer end of the tube nut.

2. A tube and tube fitting assembly comprising a fitting assembly having a body portion formed with a convexly flared tube end sealing surface, said fitting also including a tube nut portion having a bore for receiving the tube, the inner end of said tube nut having a concavely flared tube clamping surface of said fitting body portion, mating threads on said fitting portions, a tube having a flared end portion disposed between the flared surfaces of said fitting, the major extent of the bore of said tube nut having a smooth concave surface of revolution with a major diameter intermediate the flared tube clamping surface of the tube nut and the outer end of the bore of the tube nut, the diameter of both the inner and outer end portions of the bore of said tube nut being larger than that of the unflared diameter of the tube, the diameter of said inner end of the bore of the tube nut exceeding that of the outer end of the bore, said bore of the tube nut portion of the fitting accommodating and distributing flexure imparted to the tube along that portion of the tube that lies within the bore and between the clamped zone of the inner flared end portion of the tube and the portion of the tube extending through the outer end of the tube nut bore.

References Cited in the file of this patent

UNITED STATES PATENTS

| 1,820,984 | McKee | Sept. 1, 1931 |
| 1,872,536 | Weatherhead | Aug. 16, 1932 |
| 1,925,937 | Schultis | Sept. 5, 1933 |
| 2,057,669 | Brauchler | Oct. 20, 1936 |
| 2,082,164 | Karrer | June 1, 1937 |
| 2,123,999 | Lauer | July 19, 1938 |
| 2,251,715 | Parker | Aug. 5, 1941 |
| 2,372,011 | Remington et al. | Mar. 20, 1945 |
| 2,503,826 | Lamont | Apr. 11, 1950 |

FOREIGN PATENTS

| 224,021 | Great Britain | Nov. 6, 1924 |
| 886,134 | France | June 28, 1943 |
| 254,343 | Switzerland | Dec. 1, 1948 |